United States Patent [19]
Dyer et al.

[11] 4,089,055
[45] May 9, 1978

[54] ELECTRONIC MONITORING APPARATUS

[75] Inventors: David Dyer; Trevor H. Wilmshurst, both of Southampton, England

[73] Assignee: British Steel Corporation, London, England

[21] Appl. No.: 665,248

[22] Filed: Mar. 9, 1976

[30] Foreign Application Priority Data

Mar. 14, 1975 United Kingdom .............. 10767/75

[51] Int. Cl.² .......................... G01H 1/00; G06G 7/26
[52] U.S. Cl. ....................................... 364/551; 73/570; 73/658; 364/508; 364/851
[58] Field of Search ............ 235/151.3, 151.31, 151.13, 235/193–197, 184; 73/67, 67.2, 555–559, 71.4

[56] References Cited

U.S. PATENT DOCUMENTS

| 3,278,736 | 11/1966 | Pastoriza | 235/184 |
| 3,529,140 | 9/1970 | Doering | 235/151.31 |
| 3,705,297 | 12/1972 | John | 235/150.53 |
| 3,733,892 | 5/1973 | Rennick | 73/71.4 |
| 3,745,815 | 7/1973 | Bentone et al. | 73/71.4 |
| 3,803,394 | 4/1974 | Fraser | 235/197 |

OTHER PUBLICATIONS

Croxton & Cowden: (Textbook) Applied General Statistics Chapt. 10: Dispersion, Skewness and Kurtosis, pp. 239–235 of interest, Prentice–Hall, Inc., 1939.

Merkle et al.: Probability Density Functions of Measured Data, Wright Patterson Air Force Base U.S. Government Publication, 1973, pp. 181–188.

*Primary Examiner*—Felix D. Gruber
*Attorney, Agent, or Firm*—Bacon & Thomas

[57] ABSTRACT

A method and apparatus for electronically monitoring the condition of an object which normally emits stationary stochastic signals is disclosed wherein electronic signals representative of the emitted signals are generated in a plurality of at least two frequency bands and the kurtosis coefficient for these signals is determined over a period of time. Variations of the kurtosis coefficient are detected to provide an indication of the condition of the object.

7 Claims, 1 Drawing Figure

U.S. Patent May 9, 1978 4,089,055
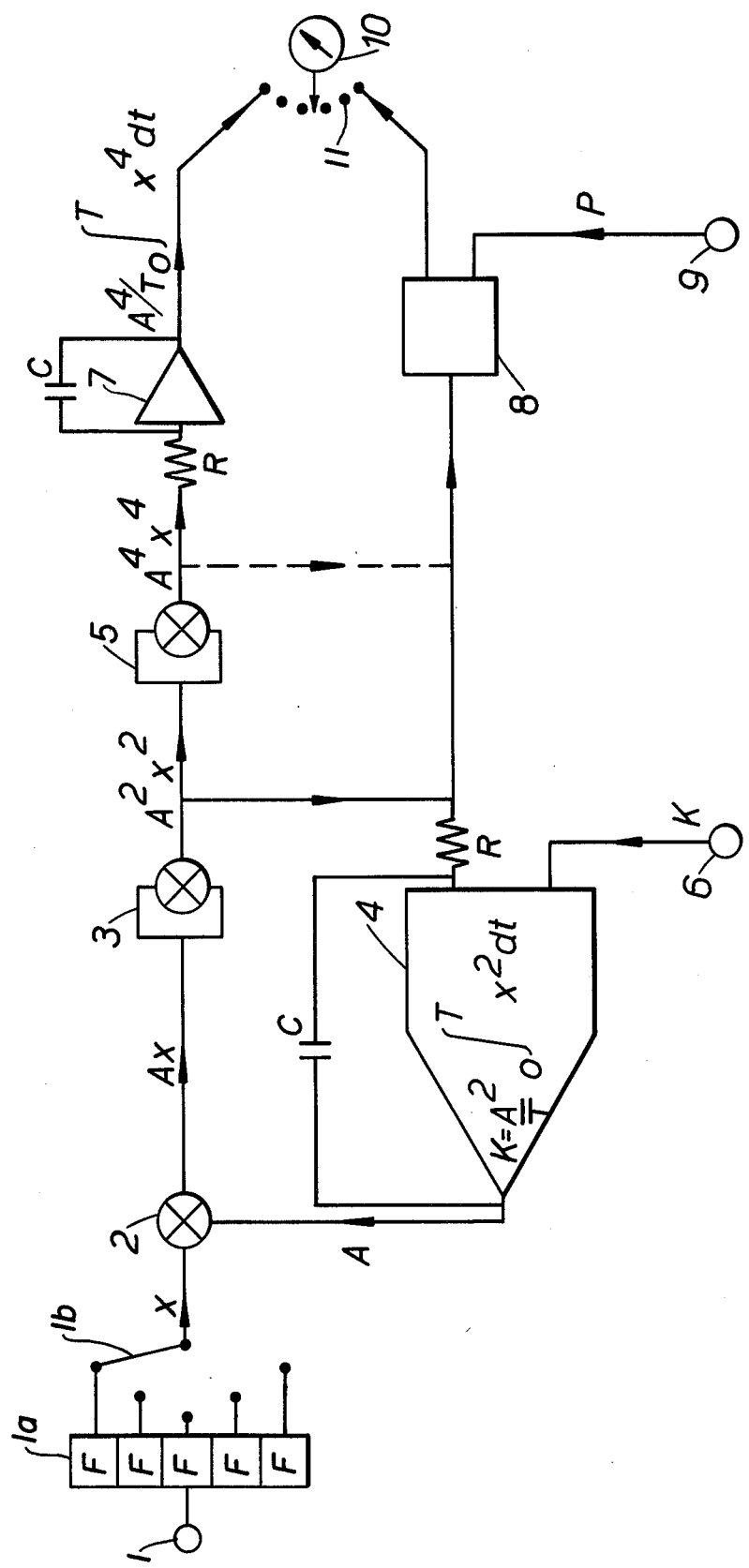

ELECTRONIC MONITORING APPARATUS

This invention relates to electronic monitoring apparatus. More especially, but not exclusively, the invention relates to apparatus for and methods of electronically monitoring the condition of machinery and other objects which normally emit stationary stochastic signals. The electronic monitoring of machinery condition makes it possible to reduce the incidence of such machinery continuing to operate with undetected faults which might ultimately lead to machine failure. For example, by monitoring and analysing the mechanical vibration patterns occurring during operation, faults in such elements as bearings can be detected and remedial action taken at a relatively early stage to prevent further damage to the machinery and reduce maintenance costs.

In accordance with one aspect of the invention, a method is disclosed for electronically monitoring the condition of an object which normally emits stationary stochastic signals comprising the steps of producing electrical signals in a plurality of at least two frequency bands representative of the emitted signals, determining over a period of time kurtosis coefficients for these signals and detecting variations in this coefficient to provide an indication of the condition of the object wherein the electrical signals are representative of vibrations occurring during operation of machinery.

In accordance with yet another aspect of the invention, apparatus is disclosed for automatically computing the kurtosis coefficient for analog signals, which apparatus comprises means for producing electrical signals proportional to the analog signal, means for filtering the electrical signal into a plurality of at least two frequency bands, means for normalizing the filtered signals with respect to their root mean square values, means for squaring the normalized signals, means for squaring the normalized square signals, and means for integrating with respect to time the squared normalized squared signals to give output signals proportional to the kurtosis value of the original analog signals.

In accordance with yet another aspect of the invention, apparatus is described for electronically monitoring the condition of an object which normally emits stationary stochastic signals comprising means for providing electrical signals in a plurality of at least two frequency bands representative of the emitted signals, means for determining over a period of time kurtosis coefficients for these signals and means for detecting variations in these kurtosis coefficients to provide an indication of the condition of the object wherein the electrical signals are representative of vibrations occurring during operation of the machinery.

Kurtosis coefficient is a statistical parameter which is defined as the normalised fourth moment and can be expressed as $$B_2 = \frac{\frac{1}{T}\int_0^T (x(t) - \bar{x})^4 dt}{\left(\frac{1}{T}\int_0^T (x(t) - \bar{x})^2 dt\right)^2}$$

where $x(t)$ is a vibration or other analogue time history
$\bar{x}$ is the mean value of $x(t)$
$T$ is the sample time
$t$ is any instant in time For an undamaged bearing the kurtosis coefficients of the mechanical vibrations observed at the bearing housing across broad frequency bands are approximately 3 irrespective of load applied, rotational speed and intrusive vibrations from surrounding equipment assuming these by nature conform to a Gaussian distribution.

With the occurrence of incipient bearing damage the character of the mechanical vibrations changes, and this is reflected by an increase in the kurtosis coefficient over the low frequency region. More extensive bearing damage results in a rise in the kurtosis coefficients at higher frequencies, whilst that at the low frequency falls back towards 3, ie. the value for the undamaged bearing. Thus, examination of the current kurtosis coefficient in different frequency bands not only enables detection of damage but also allows an estimate to be made of its extent.

The invention will now be described by way of example with reference to the accompanying diagrammatic drawings in which:

The FIGURE illustrates in block form an example of an analog-based monitoring apparatus to derive the kurtosis value.

Referring now to FIG. 1 of the drawings, an electronic transducer and signal conditioning equipment 1 eg. an accelerometer mounted on the housing of the bearing to be monitored and coupled to a charge amplifier and bandpass filters 1a produces an output voltage signal $x$, ($x = x(t) - \bar{x}$), representative of mechanical vibrations occurring at the bearing housing in different frequency bands. Signals representative of the vibrations in these different frequency bands are passed successively, via switch 1b, to a multiplier 2 which gives a product signal $Ax$ where A is a gain factor inversely proportional to the root mean square value of $x$.

The product signal $Ax$ is fed to a squarer 3 and the squared signal $A^2x^2$ is passed to both an integrator 4 and to a second squarer 5. Within the integrator 4 the mean square signal $A^2\bar{x}^2$ is equated to K, a voltage set by a variable resistor 6, to give an output which controls the gain of the multiplier 2 in accordance with the value $$A = \sqrt{K}/\sqrt{\bar{x}^2}$$

which itself is inversely proportional to the root mean square value of $x$; it will be appreciated that by this method the value of signal $x$ is thereby normalised with respect to its own root mean square value.

As mentioned above, signals from the squarer 3 representative of the normalised squared value of $x$, ie. $A^2x^2$ are passed to the squarer 5 and thence to an integrator 7 to give an output signal representative of the normalised fourth moment or kurtosis coefficient of the input signal $x$.

The dynamic range and accuracy of the apparatus described is dictated by the voltage K set by the variable resistor 6. When the peak to root mean square value of signal $x$ becomes large, momentary saturation of the squarers 3 and 5 may occur. If the time for which such saturation occurs becomes excessive, the accuracy of the measurement of kurtosis coefficient is seriously impaired. To meet this problem a threshold device 8 is provided which, as shown in the drawing in full line, receives output signals from the squarer 3 and compares these with a predetermined threshold voltage P set by a second variable resistor 9. Normally this threshold voltage would be set at a value just below the saturation level of the squarer 3. The output from the device 8 is then representative of the proportion of time that the normalised squared signal exceeds the saturation level of squarer 3 and, therefore, provides an indication of the accuracy of the current measurement of kurtosis coefficient. As indicated in broken line in the drawing, the threshold device 8 may alternatively receive signals from the squarer 5 and give an output representative of the time that the signal exceeds the saturation level of the squarer 5 which also provides an indication of the accuracy of the measured kurtosis coefficient. The value of the threshold voltage can be varied by adjustment of the setting of the resistor 9.

The output signals from the integrator 7 and from the threshold device 8 are fed via a switch 11 to a monitor 10 eg. a proportionally calibrated voltmeter to give a visual display of the current kurtosis coefficient for the mechanical vibrations measured at the bearing housing in various frequency bands and of the time for which the apparatus has been operating in an overload condition. The integration times for devices 4 and 7 are governed by the values of R and C, where $T = RC$.

Digital mechanization of the kurtosis equation is well within the current state of the art.

In one experiment carried out with monitoring apparatus similar to that described above used to monitor the condition of rolling contact bearings in a test machine, electrical signals in two or more frequency bands were fed consecutively from an accelerometer mounted adjacent the bearing housing to the monitoring apparatus to give a measure of the kurtosis coefficient of the signals in each of the frequency bands. With the bearings in an undamaged condition the kurtosis coefficients for the signals in each frequency band were found to be approximately 3. With the occurrence of incipient damage to the bearings, the coefficient for the signals in the lower of the frequency bands increased in value whilst that for the signals in the higher of the frequency bands remained relatively unchanged. With the growth of damage in the bearings the value of the coefficient for the signals in the lower of the frequency bands returned to approximately 3 whilst that for the signals in the higher of the frequency bands increased in value.

A typical monitoring system applied to works machinery would comprise a transducer and associated signal conditioning equipment mounted on the machinery to be monitored and coupled through suitable amplification equipment to a series of bandpass filters from which the output is fed to the circuitry illustrated in the drawing. The system may be calibrated with a suitable random noise source.

In an alternative arrangement to that described above the output signal from the threshold device 8 alone is used as an indication of the condition of the machinery. When used in this fashion, the signal source to the device 8 may come from squarer 3 or squarer 5 or multiplier 2.

While the invention has been described above with particular reference to monitoring the condition of rolling contact bearings, it is to be appreciated that the invention has application in other areas where one wishes to statistically classify signals which conform to a Gaussian or non-Gaussian distribution.

For example, the apparatus described above could be used to calculate kurtosis coefficients of signals emanating from hydrophonic equipment, transducers mounted on off-shore drilling platforms and within pipelines. In addition the apparatus can be employed to indicate cavitation in hydraulic machinery and for detecting the onset of damage within gears of machinery.

We claim:

1. A method of electronically monitoring the condition of an object which normally emits stationary stochastic signals comprises the steps of producing electrical signals in a plurality of at least two frequency bands representative of the emitted signals, determining over a period of time kurtosis coefficients for these signals and detecting variations in this coefficient to provide an indication of the condition of the object wherein the electrical signals are representative of vibrations occurring during operation of machinery.

2. A method as claimed in claim 1 wherein the electrical signals are representative of mechanical vibrations generated by rolling contact bearings of the machinery.

3. A method as claimed in claim 1 in which kurtosis coefficients are simultaneously or successively determined from electrical signals representative of the emitted signals in two or more frequency bands.

4. A method as recited in claim 2 in which kurtosis coefficients are simultaneously or successively determined from electrical signals representative of the emitted signals.

5. Apparatus for automatically computing the kurtosis coefficient of analog signals comprising:
means for producing electrical signals proportional to the analog signals,
means for filtering the electrical signals into a plurality of at least two frequency bands,
means for normalizing the filtered signals with respect to their root mean square values,
means for squaring the normalized signals,
means for squaring the normalized squared signals, and
means for integrating with respect to time the squared normalized squared signals to give output signals prportional to the kurtosis values of the original analog signals.

6. Apparatus for electronically monitoring the condition of an object which normally emits stationary stochastic signals comprising:
means for providing electrical signals in a plurality of at least two frequency bands representative of the emitted signals, means for determining over a period of time kurtosis coefficients for these signals and means for detecting variations in these kurtosis coefficients to provide an indication of the condition of the object wherein the electrical signals are representative of vibrations occurring during operation of machinery.

7. Apparatus as recited in claim 6 wherein the electrical signals are representative of mechanical vibrations generated by rolling contact bearings of the machinery.

* * * * *